US011068786B1

(12) United States Patent
Liu et al.

(10) Patent No.: US 11,068,786 B1
(45) Date of Patent: Jul. 20, 2021

(54) SYSTEM AND METHOD FOR DOMAIN SPECIFIC NEURAL NETWORK PRUNING

(71) Applicant: MOFFETT TECHNOLOGIES CO., LIMITED, Central (HK)

(72) Inventors: Jiachao Liu, Los Altos, CA (US); Enxu Yan, Los Altos, CA (US)

(73) Assignee: MOFFETT TECHNOLOGIES CO., LIMITED, Central (HK)

( * ) Notice: Subject to any disclaimer, the term of this patent is extended or adjusted under 35 U.S.C. 154(b) by 0 days.

(21) Appl. No.: 17/125,490

(22) Filed: Dec. 17, 2020

(51) Int. Cl.
*G06N 3/08* (2006.01)
*G06N 3/04* (2006.01)

(52) U.S. Cl.
CPC .............. *G06N 3/082* (2013.01); *G06N 3/04* (2013.01)

(58) Field of Classification Search
CPC ................................. G06N 3/082; G06N 3/04
See application file for complete search history.

(56) References Cited

U.S. PATENT DOCUMENTS 10,832,139 B2 * 11/2020 Yan ....................... G06N 3/0454
2017/0068887 A1 * 3/2017 Kwon ................... G06N 3/0454

OTHER PUBLICATIONS

Torrey, Lisa et al.; Transfer Learning; 2009 IGI Global; Handbook of Research on Machine Learning Applications; pp. 1-22. (Year: 2009).*

Yosinski J, Clune J, Bengio Y, and Lipson H.; How transferable are features in deep neural networks? ; Advances in Neural Information Processing Systems 27 (NIPS '14), NIPS Foundation, 2014; pp. 1-14. (Year: 2014).*
Liu, Jiaming et al.; Sparse Deep Transfer Learning for Convolutional Neural Network; Proceedings of the Thirty-First AAAI Conference on Artificial Intelligence (AAAI-17); pp. 2245-2251. (Year: 2017).*
Long, Mingsheng et al.; Unsupervised Domain Adaptation with Residual Transfer Networks; 30th Conference on Neural Information Processing Systems (NIPS 2016), Barcelona, Spain; pp. 1-9. (Year: 2017).*
Gordon, Mitchell et al.; Compressing BERT: Studying the Effects of Weight Pruning on Transfer Learning; Johns Hopkins University 2020; 15 pages. (Year: 2020).*
Liao, Ching Ya et al.; Convolution Filter Pruning for Transfer Learning on Small Dataset; 2020 International Computer Symposium (ICS); pp. 79-84. (Year: 2020).*

* cited by examiner

*Primary Examiner* — Stanley K. Hill

(57) ABSTRACT

Methods, systems, and apparatus, including computer programs encoded on computer storage media, for domain-specific pruning of neural networks are described. An exemplary method includes obtaining a first neural network trained based on a first training dataset; obtaining one or more second training datasets respectively from one or more domains; training, based on the first neural network and the one or more second training datasets, a second neural network comprising the first neural network and one or more branches extended from the first neural network. The one or more branches respectively correspond to the one or more domains, and each comprises one or more layers trained based on one of the one or more second training datasets. The method may further include: pruning the second neural network by reducing a number of active neurons; and applying the pruned second neural network for inferencing in the one or more domains.

20 Claims, 6 Drawing Sheets

SYSTEM AND METHOD FOR DOMAIN SPECIFIC NEURAL NETWORK PRUNING

TECHNICAL FIELD

This application generally relates to systems and methods for neural network pruning and, in particular, to systems and methods for domain-specific neural network pruning.

BACKGROUND

Machine learning (ML) has been highly popular in data-intensive applications but is often hindered when the data set is small. When accruing enough training data to train ML models for new application domains is unrealistic or difficult to achieve, existing solutions may train an ML model based on training data collected from one or more prior application domains and apply such ML model to the new domain hoping it performs well. However, small variations between the application domains may lead to disastrous output from the trained ML model. For example, ML models trained using indoor images cannot detect objects in outdoor images well (e.g., due to lighting difference), and ML models trained using data from one location/time cannot perform well for other locations/time. Furthermore, when applying an ML model like a neural network trained from prior domains to a new domain, it is possible that the computing capabilities and storage resources in the new domain are highly limited, and may be unable to host a full-size neural network that is large in size and requires expensive computational operations. To solve these problems described above, this present application describes a novel way to train domain-specific ML models with limited training data sets and prune these models to reduce the size and amount of computing required.

SUMMARY

Various embodiments of the specification include, but are not limited to, systems, methods, and non-transitory computer-readable media for domain specific neural network pruning.

According to some embodiments, a computer-implemented method for domain-specific pruning may include: obtaining a first neural network trained based on a first training dataset; obtaining one or more second training datasets respectively from one or more domains; training, based on the first neural network and the one or more second training datasets, a second neural network comprising the first neural network and one or more branches extended from the first neural network. The one or more branches respectively correspond to the one or more domains, and each comprises one or more layers trained based on one of the one or more second training datasets. The method may further include: pruning the second neural network by reducing a number of active neurons; and applying the pruned second neural network for inferencing in the one or more domains.

In some embodiments, the training of the second neural network includes: training the second neural network based on the first neural network and the one or more second training datasets until an objective function converges; and the pruning the second neural network includes: pruning the second neural network until reaching a sparsity ratio.

In some embodiments, the method further includes: increasing the sparsity ratio; and further training the pruned second neural network based on the one or more second training datasets until the objective function converges; and further pruning the further trained second neural network to reach the increased sparsity ratio until an exit condition is met.

In some embodiments, the exit condition comprises at least one of the following: a number of iterations, and the sparsity ratio has reached a target sparsity ratio.

In some embodiments, each of the one or more second training datasets comprises a plurality of supervised data records collected from a corresponding domain.

In some embodiments, the method further includes: applying the first neural network for object detections in a domain that is different from the one or more domains.

In some embodiments, the applying of the second neural network for object detections in the one or more domains includes: receiving an object detection request comprising a domain identifier; determining one of the second neural network based on the domain identifier; and performing object detection based on the one second neural network.

In some embodiments, the one or more second training datasets comprise images collected by one or more cameras representing the one or more domains, and each of the images comprises a camera identifier and at least one label.

In some embodiments, the training of the second neural network comprising the first neural network and one or more branches comprises: for each of the one or more second training datasets, extending the first neural network by creating a branch with one or more layers trained based on the second training dataset.

In some embodiments, the method further includes: pruning the first neural network before the training of the second neural network; wherein the training of the second neural network comprises: training the second neural network based on the pruned first neural network and the one or more second training datasets.

According to other embodiments, a system for domain-specific pruning includes one or more processors and one or more computer-readable memories coupled to the one or more processors and having instructions stored thereon that are executable by the one or more processors to perform operations comprising: obtaining a first neural network trained based on a first training dataset; obtaining one or more second training datasets respectively from one or more domains; training, based on the first neural network and the one or more second training datasets, a second neural network comprising the first neural network and one or more branches extended from the first neural network. The one or more branches respectively correspond to the one or more domains, and each comprises one or more layers trained based on one of the one or more second training datasets. The method may further includes: pruning the second neural network by reducing a number of active neurons; and applying the pruned second neural network for inferencing in the one or more domains.

According to yet other embodiments, a non-transitory computer-readable storage medium for domain-specific pruning is configured with instructions executable by one or more processors to cause the one or more processors to perform operations comprising: obtaining a first neural network trained based on a first training dataset; obtaining one or more second training datasets respectively from one or more domains; training, based on the first neural network and the one or more second training datasets, a second neural network comprising the first neural network and one or more branches extended from the first neural network. The one or more branches respectively correspond to the one or more domains, and each comprises one or more layers trained based on one of the one or more second training datasets. The method may further includes: pruning the second neural network by reducing a number of active neurons; and applying the pruned second neural network for inferencing in the one or more domains.

Embodiments disclosed herein have one or more technical effects. In some embodiments, a "backbone" neural network (NN) may be obtained as a foundation for training a domain-specific neural network. The "backbone" neural network may be trained based on prior or existing knowledge such as available standard datasets. The "backbone" neural network may perform well on standard scenes from which the standard datasets were collected, but not as well in domains that are different from the standard scenes. Some embodiments described herein extend the "backbone" neural network by adding one or more domain-specific "branches" that are trained based on small datasets that are collected from specific domains. The extended neural network may include the "backbone" neural network and a plurality of "branches" that respectively correspond to the specific domains. Since the "backbone" neural network may be prepared or trained offline and the training of the domain-specific layers only requires a small amount of training data (less effort to collect and label) from each specific domain, the training cost of such extended neural network is low. Because the extended neural network has a "branch" specifically trained for each domain, the accuracy of the outputs (e.g., predictions, classifications, detection) is high. This structure is more efficient than building one specific model for each specific domain because maintaining (e.g., updating, troubleshooting, deployment) one adaptive model is much simpler than maintaining hundreds or thousands of domain-specific models. In some embodiments, the extended neural network is further pruned to reduce the size and accordingly the computational cost for inferencing. The pruning is not a simple add-on step to be performed on the "backbone" neural network after the domain adaptation process (e.g., training domain-specific branches), but an operation that may be combined with the domain adaptation as an iterative process for domain-specific pruning. This iterative process may allow the resultant neural network to meet a target sparsity ratio requirement as well as the desired accuracy requirement. As a result of the pruning and domain adaptation, the trained neural network not only can perform accurately in each domain with limited training datasets but also can be easily deployed in the field thanks to its small size and low computational cost.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

DETAILED DESCRIPTION

Figure 1:
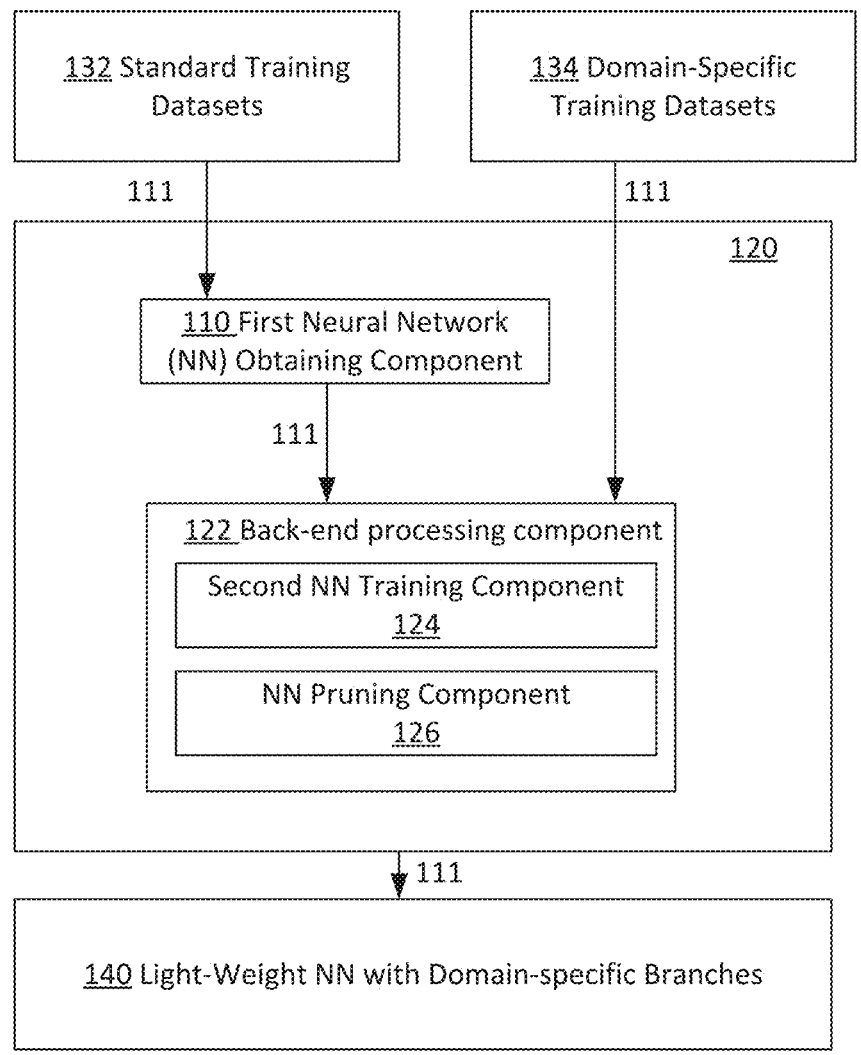
FIG. 1 illustrates an exemplary environment associated with domain-specific neural network (NN) with pruning in accordance with some embodiments.

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

Existing deep learning models generally perform poorly in specific domains for various reasons. One of the reasons is that the models are trained based on training datasets that are not collected from the specific domains, or the training datasets do not have sufficient data samples collected from the specific domains. As a result, neural networks trained using indoor images cannot detect objects in outdoor images well, and neural networks trained using data in one spatial/temporal domain cannot perform well in another spatial/temporal domain. This issue is hard to solve in practice for at least three reasons. First, a huge amount of training data need to be collected from the specific domains, which often is impractical. For example, a newly created domain monitored by a newly installed camera may not have sufficient historical data to train a model specifically for this newly created domain. Second, for supervised learning, the collected training data need to be properly labeled. Labeling a large volume of data is costly and inefficient. Third, it may take significant effort to update the model based on online data. In many use cases, the generation rate of online data is not high enough to support online training and updating of the model.

Another problem with existing deep learning models is that these models are usually bulky in size and require expensive computation resources for training and inferencing. In some embodiments, the "heavy-weight" nature of these models makes them inefficient or impractical to be deployed into specific domains. For example, these models need to be hosted on powerful servers (e.g., a cloud server or a data center) rather than being deployed on edge devices to be placed in the specific domains. It means the data collected in the domains need to be transmitted to the server to perform the expensive computations for inferencing. In some cases, the inferencing results need to be transmitted back to the edge devices to show to the users. The data transmitting cost may be critical to various applications. As such, it is more desirable to have a "light-weight" model that is not only small in size (meaning less storage footprint and cheaper computational cost) but also can produce accurate results (predictions, classification, etc.) in specific domains.

To address the above problems, an efficient domain-specific neural network training, pruning, and inferencing pipeline is described with various embodiments in the present application. In some embodiments, this pipeline involves multiple steps, including a first step of training a backbone neural network based on general-domain datasets, and a second step of finetuning and pruning the backbone neural network based on domain-specific datasets. In some embodiments, the above-described second step is designed as an iterative process to achieve optimal sparsity and accuracy.

FIG. 1 illustrates an exemplary environment associated with domain-specific neural network (NN) with pruning in accordance with some embodiments. The environment may include a computing system 120, various inputs 132 and 134 being fed into the computing system 120, and corresponding output 140 generated by the computing system 120 based on the various input 130. The computing system 120 may be implemented in one or more networks (e.g., enterprise networks), one or more endpoints, one or more servers (e.g., server), or one or more clouds. The server may include hardware or software which manages access to a centralized resource or service in a network. A cloud may include a cluster of servers and other devices that are distributed across a network. The computing system 120 may also be implemented on or as various devices such as a mobile phone, tablet, server, desktop computer, laptop computer, etc. In some embodiments, the computing system 120 may be implemented as a single device with the exemplary components shown in FIG. 1. In other embodiments, the exemplary components of computing system 120 shown in FIG. 1 may be implemented on or as separate devices. The communication channels (such as 111) among the exemplary components and inputs/outputs may be over a wired connection, the internet, through a local network (e.g., LAN), or through direct communication (e.g., BLUETOOTH™, radio frequency, infrared).

In some embodiments, the computing system 120 may include a first neural network (NN) obtaining component 110, a back-end processing component 122 that may further include a second neural network training component 124 and a neural network pruning component 126. The training datasets 132 and 134 to be fed into or captured by the computing system 120 may include various types of data, including images, point clouds, depth images, 3D scans, speech signals, videos, etc. In some embodiments, the standard training datasets 132 may refer to prior knowledge or existing data collected from standard domains, and may be fed into the first neural network obtaining component 110 for training a neural network. In some embodiments, the domain-specific training datasets 134 may refer to training samples collected from specific domains, which may or may not have overlaps with the standard training datasets 132. In some embodiments, the standard training datasets 132 and the domain-specific training datasets 134 are collected separately. For example, the standard training datasets 132 may be collected from a plurality of existing domains that have produced a large amount of training samples (e.g., historical data), while the domain-specific training datasets 134 may be collected from a specific domain that only has a small amount of training sample. The specific domain may be a small geographical area, or a specific spatial/temporal unit, or a camera monitoring the specific domain. In some embodiments, the standard training datasets 132 may or may not be labeled or partially labeled, but the domain-specific training datasets 134 may be properly labeled. Since the amount of data in the domain-specific training datasets 134 is usually small, the associated labeling cost is low.

In some embodiments, the first neural network obtaining component 110 may be configured to obtain a first neural network, referred to as a "backbone" neural network, trained based on the standard training datasets 132. The first neural network may be trained by the first neural network obtaining component 110, or may be obtained a different computing device that performed the training. In some embodiments, the training of the first neural network may be offline. Since the first neural network is trained based on the standard training datasets 132, it may perform well in standard domains from where the standard training datasets 132 are collected. However, as explained above, it may not perform well in specific domains due to a lack of proper training data.

In some embodiments, the back-end processing component 122 may be configured to finetune and prune the first neural network based on the domain-specific training datasets 134. The domain-specific training datasets 134 may be collected respectively from one or more specific domains. In some embodiments, the second neural network training component 124 in the back-end processing component 122 may be configured to train, based on the first neural network and the domain-specific training datasets 134, a second neural network that may be adapted to the one or more domains. In some embodiments, the second neural network may include the first neural network as a foundation and one or more domain-specific "branches" corresponding to the one or more domains. The first neural network and each "branch" may form a domain-specific model that may be applied to the corresponding domain. Here, each "branch" may include one or more neural network layers extended from the first neural network, and the parameters associated with the one or more neural network layers in the branch are trained based on the second training dataset collected from the corresponding domain. In some embodiments, the training of the second neural network may include: for each of the one or more second training datasets, extending the first neural network by creating a branch with one or more layers trained based on the second training dataset.

In some embodiments, the neural network pruning component 126 in the back-end processing component 122 may be configured to reduce the number of active neurons at least in the first neural network. In some embodiments, the first neural network within the second neural network is trained based on a large amount of data and includes a large number of neurons, while each branch extended from the first neural network is trained based on a small amount of data and thus include a small number of neurons. For this reason, an effective way to reduce the size of the second neural network may be pruning the first neural network therein. In some embodiments, the pruning process may also sparsify the neurons in the branches. In some embodiments, the pruning and training of the second neural network may be executed as an iterative process. For example, the iterative process includes: training the second neural network based on the first neural network and the one or more second training datasets until an objective function converges; pruning the first neural network until reaching a sparsity ratio; increasing the sparsity ratio until an exit condition is met; and if the exit condition is not met, retraining the second neural network based on the pruned first neural network and the one or more second training datasets, and followed by pruning the first neural network to reach the increased sparsity ratio. For another example, the iterative process includes: pruning the first neural network until reaching a sparsity ratio; training the second neural network based on the pruned first neural network and the one or more second training datasets until an objective function converges; increasing the sparsity ratio until an exit condition is met; and if the exit condition is not met, further pruning the first neural network to reach the increased sparsity ratio, and followed by retraining the second neural network based on the further pruned first neural network. In some embodiments, the exit condition includes at least one of the following: a number of iterations and the sparsity ratio has reached a target sparsity.

In some embodiments, the output 140 generated by the computing system 120 may include a pruned domain-specific neural network that is lightweight and can perform well in specific domains. The specific application of the neural network is not limited in this application, which may include object detection or identification, object counting, classification, prediction, recommendation (e.g., in a recommender system), segmentation, voice recognition, various signal processing, or any other suitable applications.

Figure 2:
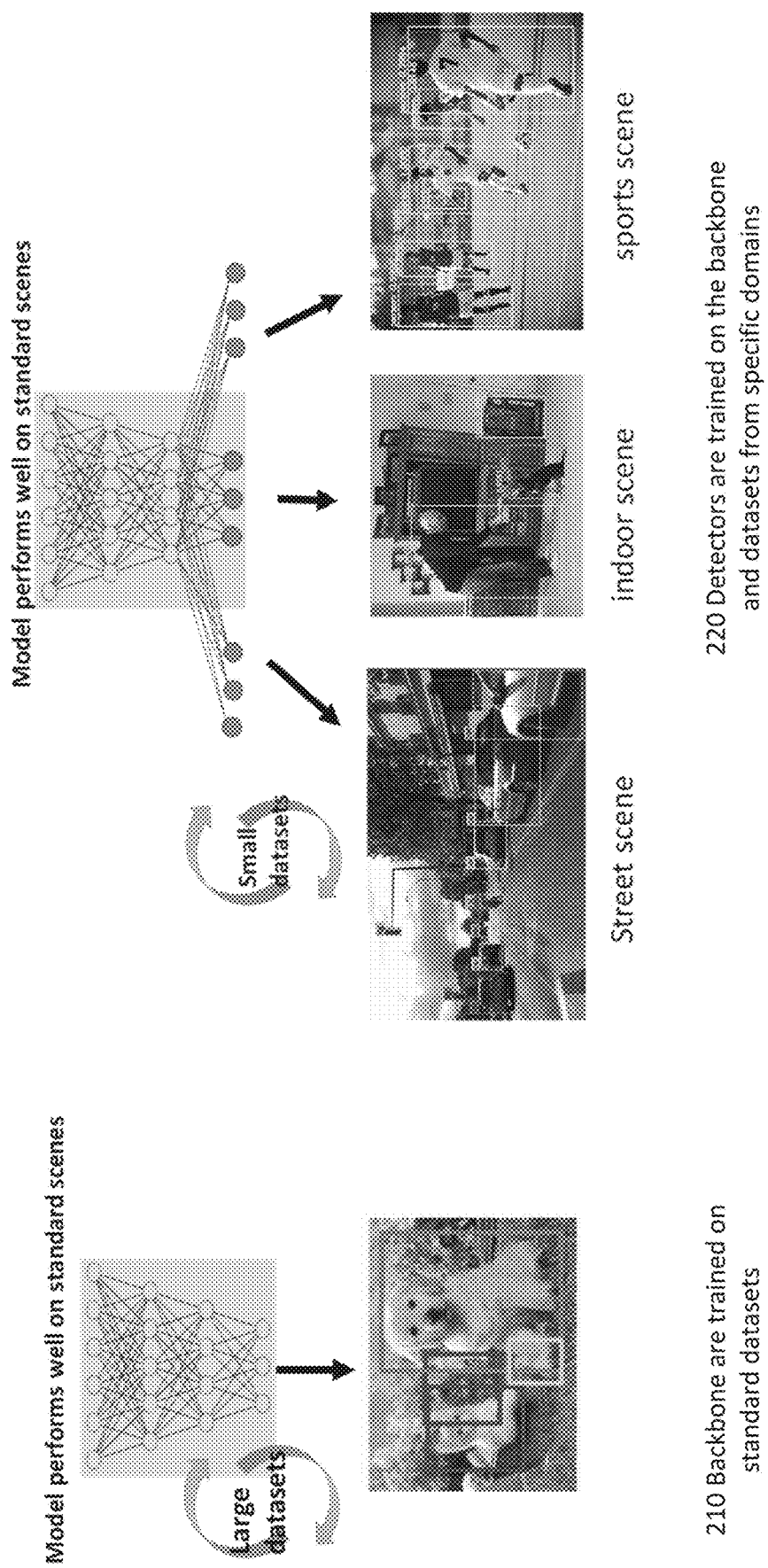
FIG. 2 illustrates an exemplary diagram of a domain-specific neural network in accordance with some embodiments.

FIG. 2 illustrates an exemplary diagram of a domain-specific neural network in accordance with some embodiments. The diagram in FIG. 2 shows a backbone neural network 210 (referring to the first neural network in FIG. 1) trained on standard datasets and a plurality of detectors 220 that is trained based on the backbone neural network 210 and datasets collected from specific domains. The structures of the backbone neural network 210 and the detectors 220 are illustrative and, depending on the implementation, may have different structures.

In some embodiments, the backbone neural network 210 may be trained based on standard training data collected from general domains. A trained backbone neural network 210 may perform well in these general domains. However, its ability to adapt to new domains may be questionable. In FIG. 2, the illustrative backbone neural network 210 is trained to detect objects in images. The training data may include the ImageNet dataset and/or CoCo dataset. In some embodiments, the volume of these standard training datasets is usually large, and thus labeling of these standard training datasets may not be required. The backbone neural network 210 may be trained by supervised learning, unsupervised learning, semi-supervised learning, or another suitable learning method (e.g., by transforming the training dataset or generating new labeled training datasets through a generative adverbial network (GAN)).

In some embodiments, the backbone neural network 210 may be used as a foundation to train detectors 220 for specific domains. Here, a domain may refer to a geographic location, a spatial and/or temporal unit, or another suitable form. As a simple example, a domain may be represented by a surveillance camera monitoring a spatial unit (e.g., an isle in a store, a park). In comparison to the general domains, the classes or types of the objects to be detected within the specific domain are usually limited. For this reason, a small number of training samples with proper labeling may provide a good amount of information to finetune the backbone neural network 210 into a detector 220 for the specific domain. The specific domains illustrated in FIG. 2 includes a street scene, an indoor scene, and a sports scene. Based on the small datasets collected from these specific domains, the backbone neural network 210 may be extended by creating "branches" respectively corresponding to the specific domains. As shown in FIG. 2, three "branches" are created for the three different domains. Here, a branch includes one or more layers that are extended from the backbone neural network 210. These one or more layers are trained based on the small dataset collected from a domain corresponding to the branch.

In some embodiments, the "branches" extended from the backbone neural network 210 may not be extended from the last layer (e.g., the output layer) of the backbone neural network 210. Usually, the last layer of a neural network refers to an output layer responsible for computations and transferring information (predictions/classifications) from the network to the user. Thus, for each of the "branches," the one or more layers in the branch may include a new output layer corresponding to a specific domain. In some embodiments, the one or more layers may also include one or more new hidden layers to process features and input the processed features into the new output layer. As illustrated in FIG. 2, the backbone neural network 210 contains four layers, and the detectors 220 share the first three layers of the backbone neural network 210 and each contains a branch as a new fourth layer extended from the backbone neural network 210.

Figure 3:
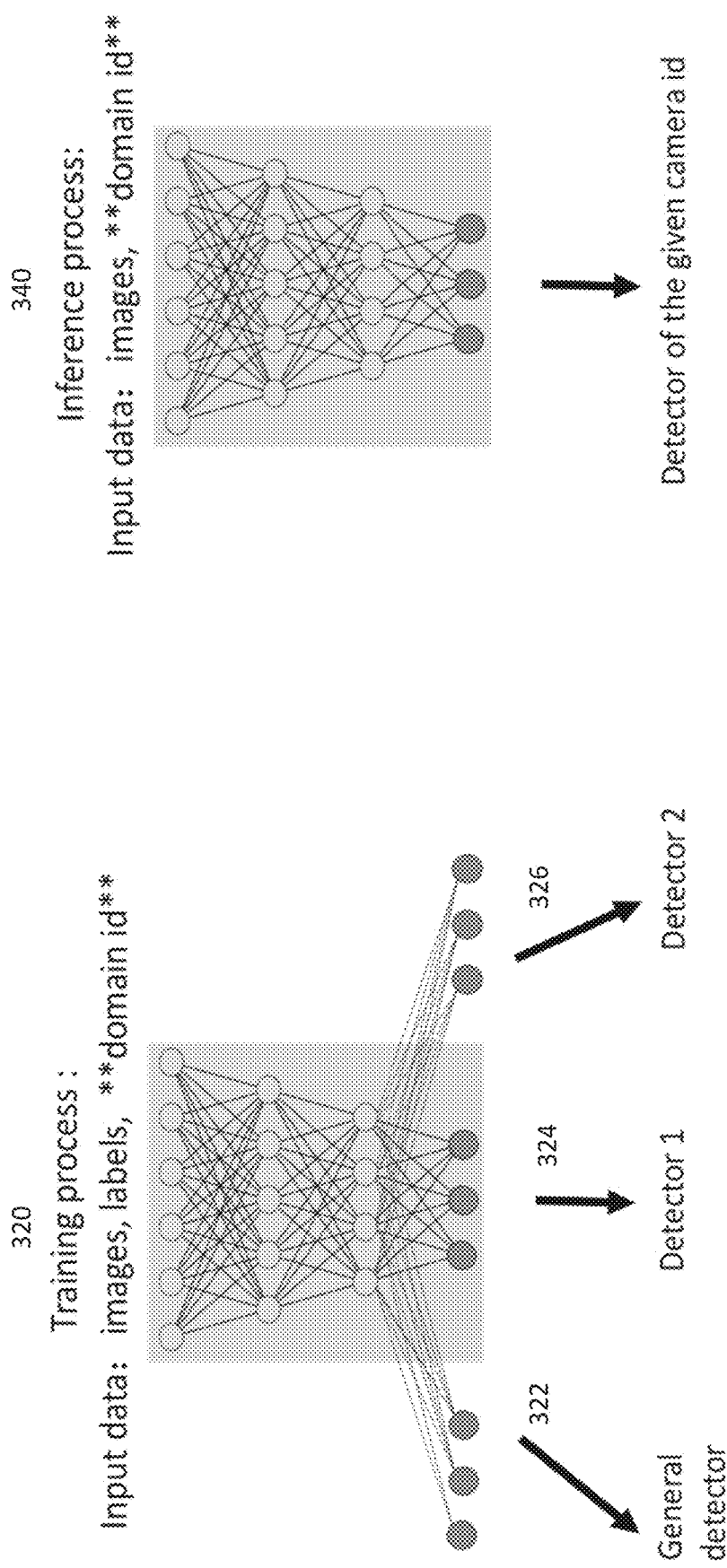
FIG. 3 illustrates an exemplary diagram of a training process and an inferencing process of a domain-specific neural network, in accordance with some embodiments.

FIG. 3 illustrates an exemplary diagram of a training process 320 and an inferencing process 340 of a domain-specific neural network, in accordance with some embodiments. The training process 320 refers to training the above-described "branches" respectively corresponding to specific domains. It is assumed that the backbone neural network has already been trained based on standard training datasets.

As shown in the training process 320 illustrated in FIG. 3, in some embodiments, the input data from each specific domain includes images, labels of the images, and a domain identifier. The domain identifier is a unique identification of the specific domain. For example, if a surveillance camera monitoring a domain is used to represent the domain, the camera's identifier may be used as the domain identifier. The camera's identifier may include its IP address, MAC address, serial number, or another suitable identifier.

In some embodiments, the newly trained "branches" (e.g., newly trained output layers) extended from the backbone neural network may be referred to as detectors 324 and 326 for specific domains, and the original output layer of the backbone neural network is retained as a general detector 322. The domain-specific detectors 324 and 326 may be deployed in the corresponding domains for object detection. The general detector 322 may be deployed in standard domains or a domain that is not one of the specific domains for object detection. That is, for a given domain, if there is no one branch corresponding to the given domain, the general detector 322 may be used as a default detector to detect objects in the given domain.

In some embodiments, the inference process 340 may start with receiving input data collected from a specific domain. As shown in FIG. 3, the received input data may include images and the domain identifier of the domain from which the images are collected. During the inference process 340, the domain identifier may be used to determine which detector (i.e., which branch) needs to be activated. The images may then be fed into the detector (including some layers from the backbone neural network and one or more layers in the branch) for object detection.

Figure 4:
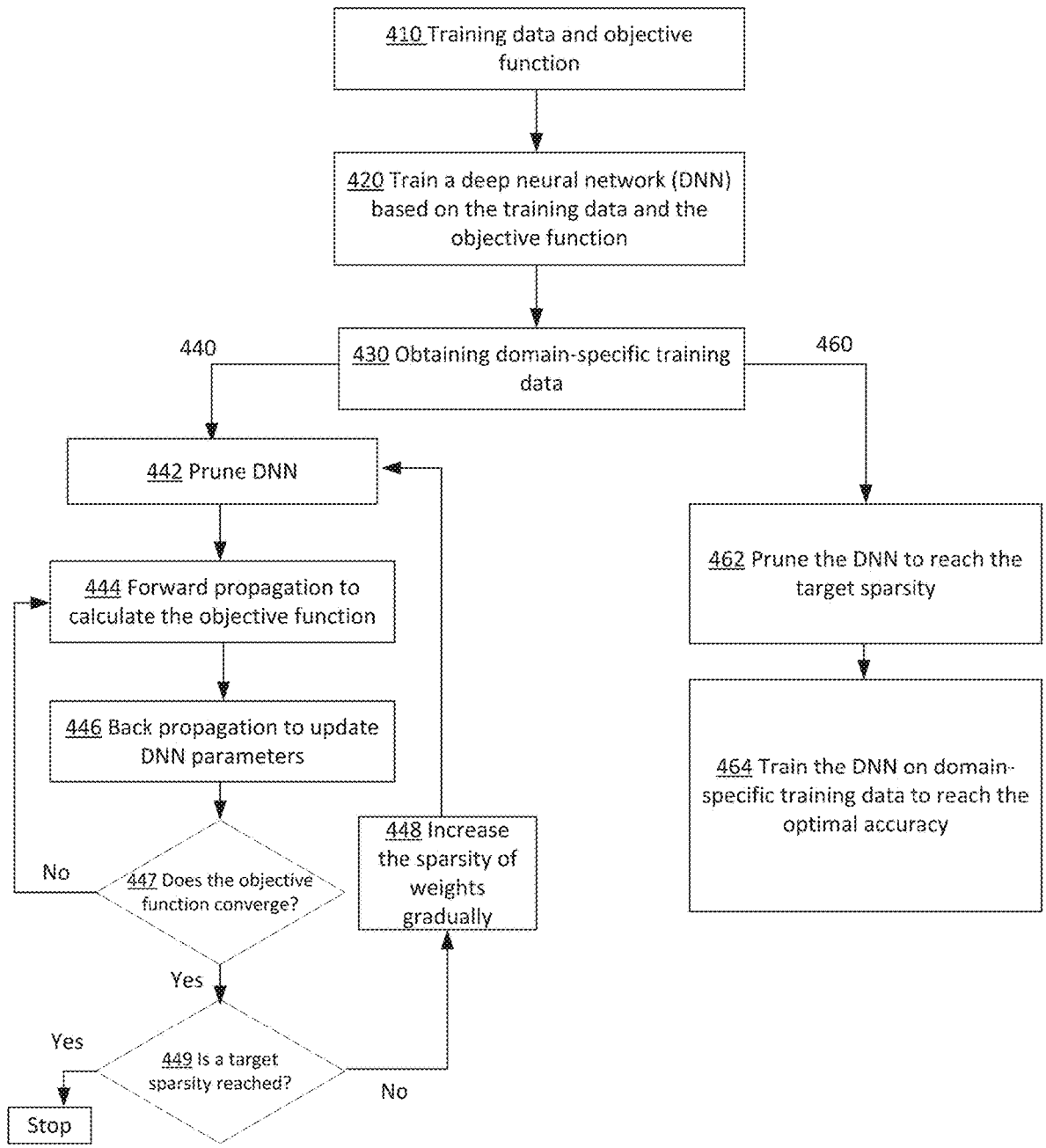
FIG. 4 illustrates an exemplary flow chart of training and pruning domain-specific neural network in accordance with some embodiments.

FIG. 4 illustrates an exemplary flow chart of training and pruning domain-specific neural network in accordance with some embodiments. The flow chart is for illustrative purposes, and depending on the implementation, the flow chart may include fewer steps, more steps, alternative steps, or steps in a different order. The operations performed in steps in the flow chart may be replaced with other suitable operations to achieve similar effects.

In some embodiments, step 410 includes obtaining training data and an objective function. The training data may refer to standard training datasets collected from general domains. The objective function may refer to a performance measurement that indicates a performance target that a to-be-trained neural network needs to meet.

In some embodiments, step 420 includes training a deep neural network (DNN) based on the training data and the objective function from step 410. This DNN may refer to the "backbone" neural network in the above descriptions. In some embodiments, steps 410 and 420 may be replaced by a step of "obtaining the DNN" since the training of the DNN may be performed offline and by another computing device/system or another entity.

In some embodiments, step 430 includes obtaining domain-specific training datasets. Each of the domain-specific training datasets may include a plurality of supervised data records collected from a corresponding domain. Here, the "supervised data records" may refer to data samples with proper labels and extra information such as domain identifiers, which may be useful in training and identifying domain-specific detectors.

As shown in FIG. 4, the flow chart after step 430 has two different routes 440 and 460, which represent two different embodiments for training and pruning a domain-specific DNN.

The embodiment illustrated in route 440 may include the following steps: pruning the first neural network until reaching a sparsity ratio; training the second neural network based on the pruned first neural network and the one or more second training datasets until an objective function converges; increasing the sparsity ratio; and further training the pruned second neural network based on the one or more second training datasets until the objective function converges; and further pruning the further trained second neural network to reach the increased sparsity ratio until an exit condition is met.

For example, the DNN may be pruned at step 442. Pruning the DNN is to discourage the activations of neurons in the DNN such that, during inference, a significant portion of (different) neurons are not activated when running on different input data. That is, after pruning, each input data activates a small fraction of the neurons in the DNN, thereby reducing the number of operations required during inference and also the storage required for the vector representation (embedding) produced by the DNN for each input data.

In some embodiments, the pruning of the DNN may have a target sparsity ratio as the ultimate goal to reach. However, the pruning in step 442 do not have to reach the target sparsity ratio at one shot. This is because the pruning process reduces the computational cost and size of the DNN at the expense of inferencing accuracy. In order to reach an optimal balance between these two conflicting interests, the pruning of the DNN in step 442 and the training process involved in steps 444 and 446 may be constructed as an iterative process. That is, the pruning of the DNN in step 442 may gradually increase the sparsity of the DNN and accordingly gradually decrease the inferencing accuracy of the DNN, while the training steps in 444 and 446 may gradually regain the lost inferencing accuracy by, for example, adjusting the parameters in the DNN, and/or adding new layers and adjusting parameters in the new layers based on the domain-specific training data. This iterative process may be terminated when an exit condition is met. In some embodiments, the exit condition includes at least one of the following: a number of iterations and the sparsity ratio has reached a target sparsity.

In some embodiments, steps 444 and 446 involve training a second DNN based on the DNN obtained in step 420. For simplicity, the DNN obtained in step 420 is referred to as the first DNN. The training process of the second DNN may include feeding the domain-specific training data, forward-propagation to calculate the objective function in step 444, and backpropagation to update the parameters in the second DNN in step 446. After the training process, the performance (e.g., prediction/classification accuracy) of the second DNN may be measured in step 447 to determine whether the objective function converges. If the objective function does not converge, the training steps 444 and 446 may be repeated. If the objective function converges, the sparsity of the second DNN is measured in step 449 by determining whether a target sparsity is reached. If the target sparsity is not reached, the second DNN may be further pruned by increasing the sparsity of the weights (parameters) gradually in step 448, and the pruning and training may be repeated from step 442. If the target sparsity is reached, it means the iterative process of training and pruning of the second DNN has finished.

In some embodiments, the orders of the pruning step 442 and the training steps 444 and 446 may be changed. For example, the iterative process may include the following steps: training the second neural network based on the first neural network and the one or more second training datasets until an objective function converges; pruning the first neural network until reaching a sparsity ratio; increasing the sparsity ratio until an exit condition is met; and if the exit condition is not met, retraining the second neural network based on the pruned first neural network and the one or more second training datasets, and followed by pruning the first neural network to reach the increased sparsity ratio.

The embodiment illustrated in route 460 may include the following steps: pruning the first DNN to reach the target sparsity ratio in step 462, and training the second DNN based on the first pruned DNN and the domain-specific training datasets in step 464. The pruning of the first DNN in step 462 may adopt an iterative process to gradually reduce the active neurons in the first DNN during inferencing until reaching the target sparsity ratio. Comparing to the embodiment illustrated in route 440, once step 462 in the route 460 is finished, the first DNN is already pruned, and there is no further pruning to the first DNN in the following steps. As explained above, pruning the first DNN may lose some performance due to the reduced number of active neurons. The lost performance may be regained in step 464 by training the second DNN based on the pruned first DNN and the domain-specific training data to reach the optimal accuracy.

Figure 5:
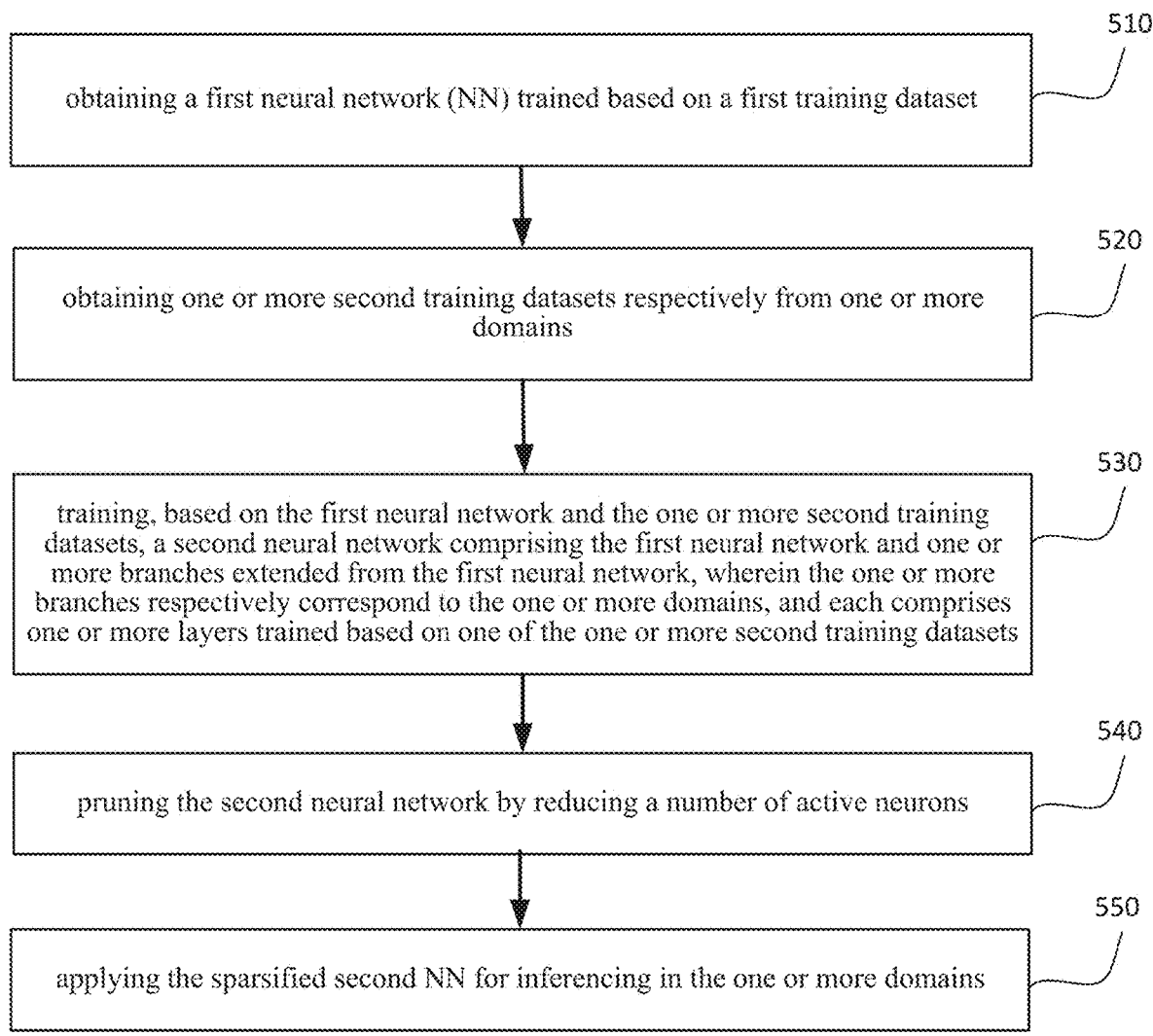
FIG. 5 illustrates an exemplary method for training and pruning domain-specific neural network in accordance with some embodiments.

FIG. 5 illustrates an exemplary method 500 for fast object detection with bounding-box correction, in accordance with some embodiments. The method 500 may be implemented in an environment shown in FIG. 1. The method 500 may be performed by a device, apparatus, or system illustrated by FIGS. 1-4, such as system 120. The method 500 is for illustrative purposes and may include more, fewer, or alternative steps depending on the implementation and practical considerations.

Block 510 includes obtaining a first neural network trained based on a first training dataset.

Block 520 includes obtaining one or more second training datasets respectively from one or more domains. In some embodiments, each of the one or more second training datasets comprises a plurality of supervised data records collected from a corresponding domain. In some embodiments, the one or more second training datasets comprise images collected by one or more cameras representing the one or more domains, and each of the images comprises a camera identifier and at least one label.

Block 530 includes training, based on the first neural network and the one or more second training datasets, a second neural network comprising the first neural network and one or more branches extended from the first neural network, wherein the one or more branches respectively correspond to the one or more domains, and each comprises one or more layers trained based on one of the one or more second training datasets. In some embodiments, the training the second neural network comprises: training the second neural network based on the first neural network and the one or more second training datasets until an objective function converges; and the pruning the second neural network comprises: pruning the second neural network until reaching a sparsity ratio. In some embodiments, the training of the second neural network further comprises: increasing the sparsity ratio; and further training the pruned second neural network based on the one or more second training datasets until the objective function converges; and further pruning the further trained second neural network to reach the increased sparsity ratio until an exit condition is met. In some embodiments, the exit condition comprises at least one of the following: a number of iterations, and the sparsity ratio has reached a target sparsity ratio. In some embodiments, the training the second neural network comprising the first neural network and one or more branches comprises: for each of the one or more second training datasets, extending the first neural network by creating a branch with one or more layers trained based on the second training dataset.

Block 540 includes pruning the second neural network by reducing a number of active neurons.

Block 550 includes applying the pruned second neural network for inferencing in the one or more domains. In some embodiments, the applying the second neural network for object detections in the one or more domains comprises: receiving an object detection request comprising a domain identifier; determining one of the second neural network based on the domain identifier; and performing object detection based on the one second neural network.

In some embodiments, the method 500 further includes applying the first neural network for object detections in a domain that is different from the one or more domains.

In some embodiments, pruning the first neural network before the training of the second neural network; wherein the training of the second neural network comprises: training the second neural network based on the pruned first neural network and the one or more second training datasets.

Figure 6:
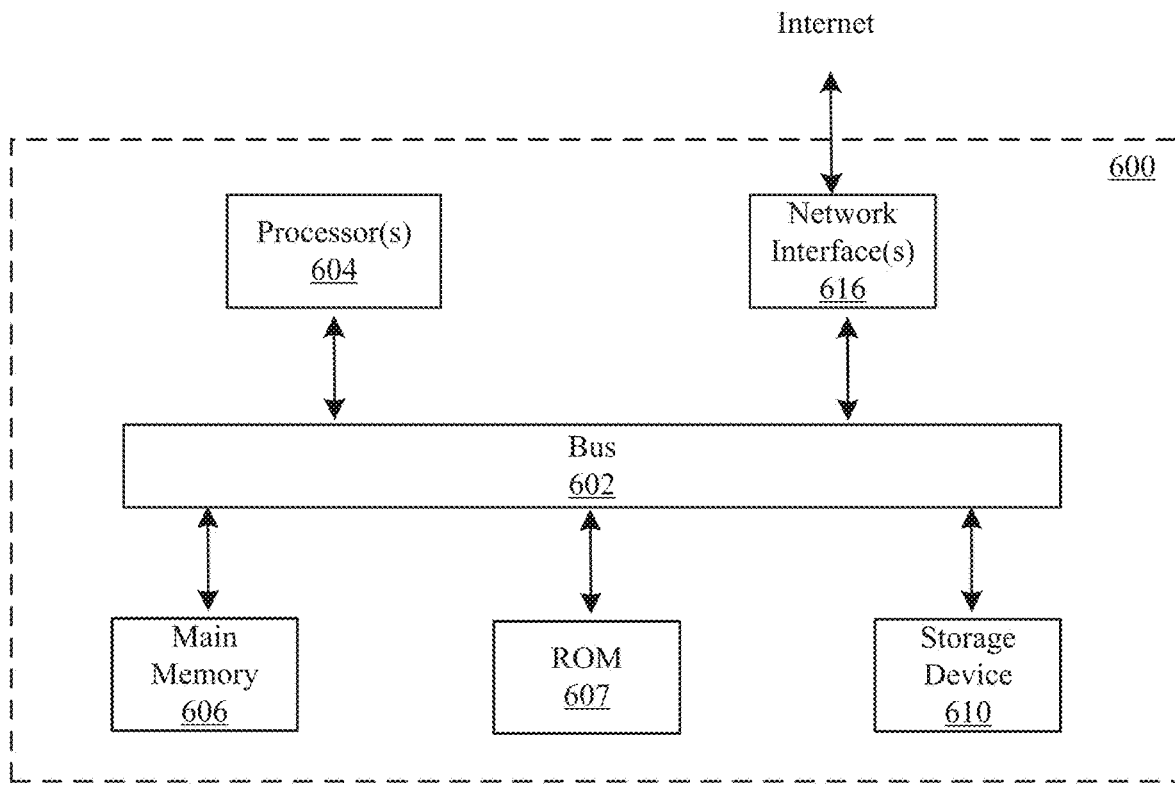
FIG. 6 illustrates a block diagram of a computer system in which any of the embodiments described herein may be implemented.

FIG. 6 illustrates a block diagram of a computer system 600 in which any of the embodiments described herein may be implemented. The computer system 600 may be implemented in any of the components of the environments or systems illustrated in FIGS. 1-5. One or more of the example methods illustrated by FIGS. 1-5 may be performed by one or more implementations of the computer system 600.

The computer system 600 may include a bus 602 or another communication mechanism for communicating information, one or more hardware processor(s) 604 coupled with bus 602 for processing information. Hardware processor(s) 604 may be, for example, one or more general-purpose microprocessors.

The computer system 600 may also include a main memory 606, such as a random-access memory (RAM), cache and/or other dynamic storage devices, coupled to bus 602 for storing information and instructions executable by processor(s) 604. Main memory 606 also may be used for storing temporary variables or other intermediate information during execution of instructions executable by processor(s) 604. Such instructions, when stored in storage media accessible to processor(s) 604, render computer system 600 into a special-purpose machine that is customized to perform the operations specified in the instructions. The computer system 600 may further include a read only memory (ROM) 608 or other static storage device coupled to bus 602 for storing static information and instructions for processor(s) 604. A storage device 610, such as a magnetic disk, optical disk, or USB thumb drive (Flash drive), etc., may be provided and coupled to bus 602 for storing information and instructions.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the operations, methods, and processes described herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 may cause processor(s) 604 to perform the process steps described herein. In alternative embodiments, hard-wired circuitry may be used in place of or in combination with software instructions.

The main memory 606, the ROM 607, and/or the storage device 610 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 600 may include a network interface 618 coupled to bus 602. Network interface 618 may provide a two-way data communication coupling to one or more network links that are connected to one or more local networks. For example, network interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicate with a WAN). Wireless links may also be implemented. In any such implementation, network interface 618 may send and receive electrical, electromagnetic or optical signals that carry digital data streams representing various types of information.

The computer system 600 can send messages and receive data, including program code, through the network(s), network link and network interface 618. In the Internet example, a server might transmit a requested code for an application program through the Internet, the ISP, the local network and the network interface 618.

The received code may be executed by processor(s) 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific embodiments, various modifications and changes may be made to these embodiments without departing from the broader scope of embodiments of the specification. The Detailed Description should not to be taken in a limiting sense, and the scope of various embodiments is defined only by the appended claims, along with the full range of equivalents to which such claims are entitled. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

The invention claimed is:

1. A computer-implemented method, comprising:
   obtaining a first neural network trained based on a first training dataset;
   obtaining one or more second training datasets respectively from one or more domains;
   training, based on the first neural network and the one or more second training datasets, a second neural network comprising the first neural network and one or more branches extended from the first neural network, wherein the one or more branches respectively correspond to the one or more domains, and each comprises one or more layers trained based on one of the one or more second training datasets;
   pruning the second neural network by reducing a number of active neurons; and
   applying the pruned second neural network for inferencing in the one or more domains.

2. The method of claim 1, wherein the training the second neural network comprises:
   training the second neural network based on the first neural network and the one or more second training datasets until an objective function converges; and
   the pruning the second neural network comprises:
   pruning the second neural network until reaching a sparsity ratio.

3. The method of claim 2, wherein the training the second neural network further comprises:
   increasing the sparsity ratio; and
   further training the pruned second neural network based on the one or more second training datasets until the objective function converges; and
   further pruning the further trained second neural network to reach the increased sparsity ratio until an exit condition is met.

4. The method of claim 3, wherein the exit condition comprises at least one of the following: a number of iterations, and the sparsity ratio has reached a target sparsity ratio.

5. The method of claim 1, wherein each of the one or more second training datasets comprises a plurality of supervised data records collected from a corresponding domain.

6. The method of claim 1, further comprising:
applying the first neural network for object detections in a domain that is different from the one or more domains.

7. The method of claim 1, wherein the applying the second neural network for object detections in the one or more domains comprises:
receiving an object detection request comprising a domain identifier;
determining one of the second neural network based on the domain identifier; and
performing object detection based on the one second neural network.

8. The method of claim 1, wherein the one or more second training datasets comprise images collected by one or more cameras representing the one or more domains, and each of the images comprises a camera identifier and at least one label.

9. The method of claim 1, wherein the training the second neural network comprising the first neural network and one or more branches comprises:
for each of the one or more second training datasets, extending the first neural network by creating a branch with one or more layers trained based on the second training dataset.

10. The method of claim 1, further comprising:
pruning the first neural network before the training of the second neural network;
wherein the training of the second neural network comprises:
training the second neural network based on the pruned first neural network and the one or more second training datasets.

11. A system comprising one or more processors and one or more non-transitory computer-readable memories coupled to the one or more processors and configured with instructions executable by the one or more processors to cause the system to perform operations comprising:
obtaining a first neural network trained based on a first training dataset;
obtaining one or more second training datasets respectively from one or more domains;
training, based on the first neural network and the one or more second training datasets, a second neural network comprising the first neural network and one or more branches extended from the first neural network, wherein the one or more branches respectively correspond to the one or more domains, and each comprises one or more layers trained based on one of the one or more second training datasets;
pruning the second neural network by reducing a number of active neurons; and
applying the pruned second neural network for inferencing in the one or more domains.

12. The system of claim 11, wherein the training the second neural network comprises:
training the second neural network based on the first neural network and the one or more second training datasets until an objective function converges; and
the pruning the second neural network comprises:
pruning the second neural network until reaching a sparsity ratio.

13. The system of claim 12, wherein the training the second neural network further comprises:
increasing the sparsity ratio; and
further training the pruned second neural network based on the one or more second training datasets until the objective function converges; and
further pruning the further trained second neural network to reach the increased sparsity ratio until an exit condition is met.

14. The system of claim 11, wherein the applying the second neural network for object detections in the one or more domains comprises:
receiving an object detection request comprising a domain identifier;
determining one of the second neural network based on the domain identifier; and performing object detection based on the one second neural network.

15. The system of claim 11, wherein the operations further comprise:
pruning the first neural network before the training of the second neural network;
wherein the training of the second neural network comprises:
training the second neural network based on the pruned first neural network and the one or more second training datasets.

16. A non-transitory computer-readable storage medium configured with instructions executable by one or more processors to cause the one or more processors to perform operations comprising:
obtaining a first neural network trained based on a first training dataset;
obtaining one or more second training datasets respectively from one or more domains;
training, based on the first neural network and the one or more second training datasets, a second neural network comprising the first neural network and one or more branches extended from the first neural network, wherein the one or more branches respectively correspond to the one or more domains, and each comprises one or more layers trained based on one of the one or more second training datasets;
pruning the second neural network by reducing a number of active neurons; and
applying the pruned second neural network for inferencing in the one or more domains.

17. The non-transitory computer-readable storage medium of claim 16, wherein the training the second neural network comprises:
training the second neural network based on the first neural network and the one or more second training datasets until an objective function converges; and
the pruning the second neural network comprises:
pruning the second neural network until reaching a sparsity ratio.

18. The non-transitory computer-readable storage medium of claim 17, wherein the training the second neural network further comprises:
increasing the sparsity ratio; and
further training the pruned second neural network based on the one or more second training datasets until the objective function converges; and
further pruning the further trained second neural network to reach the increased sparsity ratio until an exit condition is met.

19. The non-transitory computer-readable storage medium of claim 16, wherein the applying the second neural network for object detections in the one or more domains comprises:

receiving an object detection request comprising a domain identifier;

determining one of the second neural network based on the domain identifier; and performing object detection based on the one second neural network.

20. The non-transitory computer-readable storage medium of claim 16, wherein the operations further comprise:

pruning the first neural network before the training of the second neural network;

wherein the training of the second neural network comprises:

training the second neural network based on the pruned first neural network and the one or more second training datasets.

\* \* \* \* \*